No. 807,471. PATENTED DEC. 19, 1905.
F. A. KIME.
STACKER.
APPLICATION FILED JAN. 9, 1905.
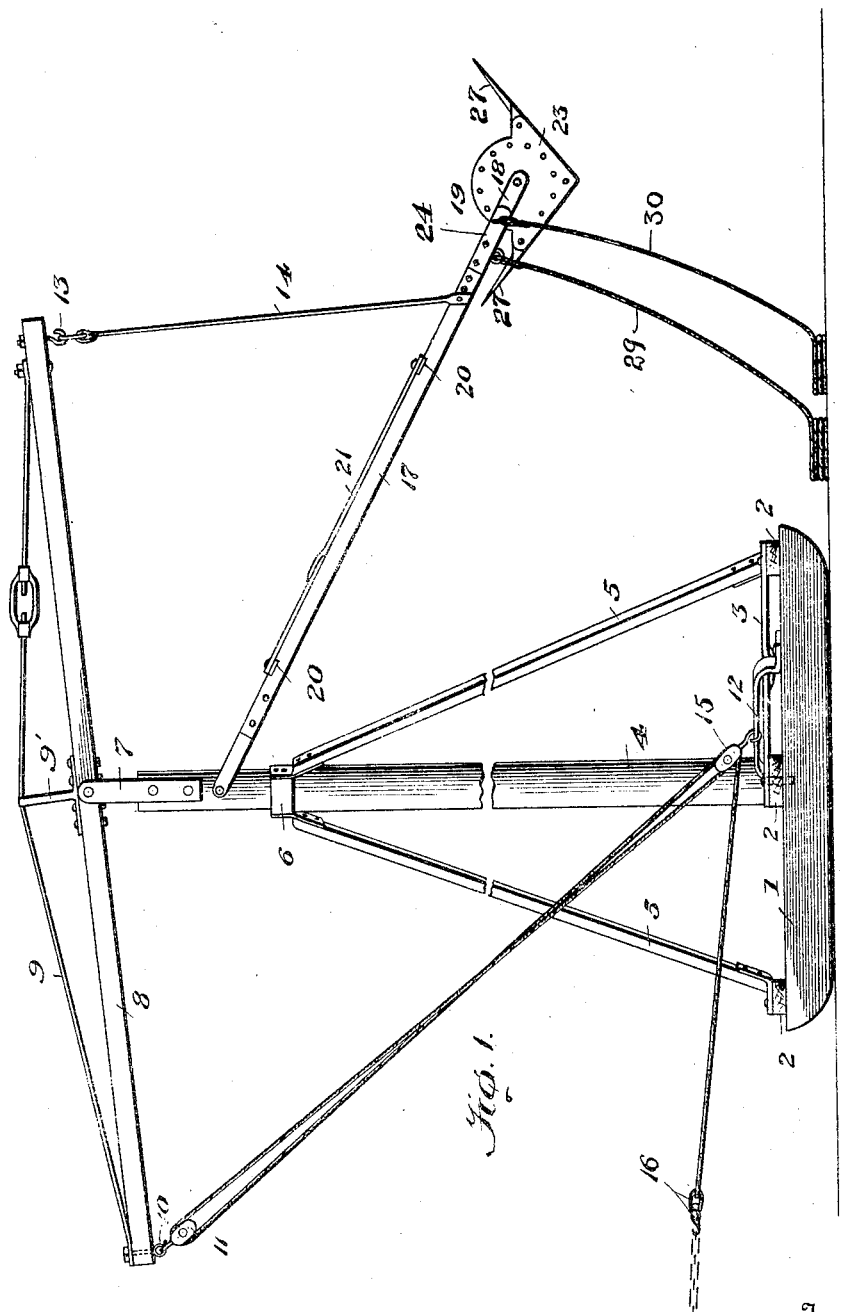

No. 807,471. PATENTED DEC. 19, 1905.
F. A. KIME.
STACKER.
APPLICATION FILED JAN. 9, 1905.
2 SHEETS—SHEET 2.
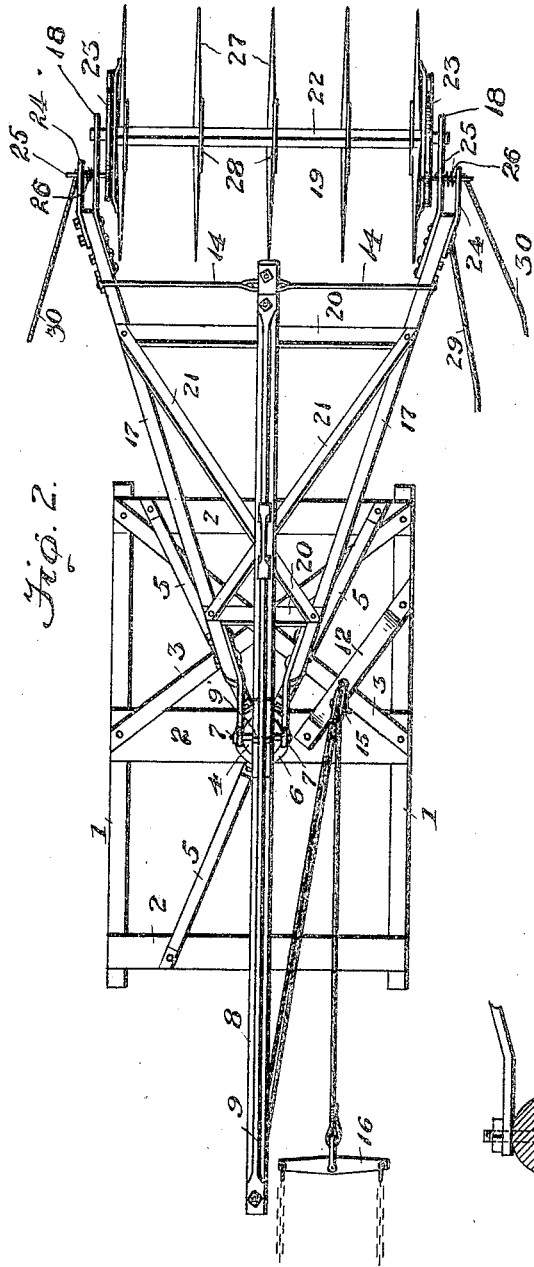
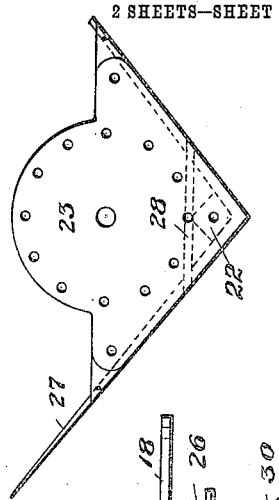
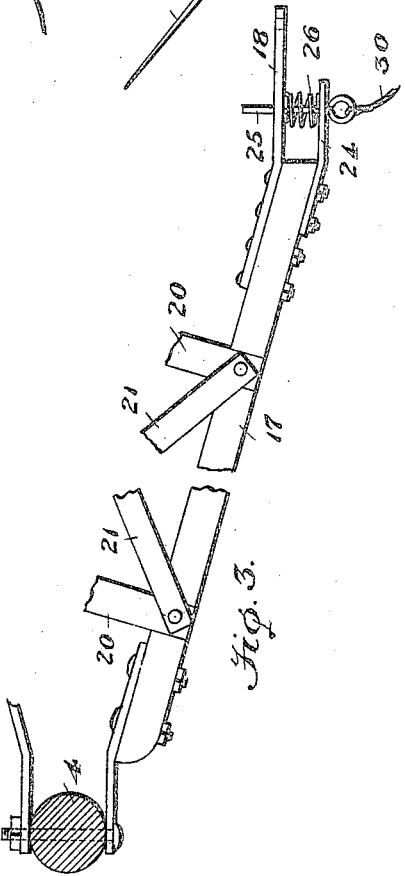
Witnesses
Inventor
Frank Alton Kime
by Henry N. Copp
his Attorney

UNITED STATES PATENT OFFICE.

FRANK ALTON KIME, OF WESTFALL, OREGON.

STACKER.

No. 807,471.   Specification of Letters Patent.   Patented Dec. 19, 1905.

Application filed January 9, 1905. Serial No. 240,299.

*To all whom it may concern:*

Be it known that I, FRANK ALTON KIME, a citizen of the United States, residing at Westfall, county of Malheur, and State of Oregon, have invented certain new and useful Improvements in Stackers, of which the following is a specification.

My invention relates to stackers, and more especially to power-operated stackers; and the invention has for its object the provision of means whereby the load of hay which is lifted by the stacker may be deposited in any suitable place upon the stack to be formed.

A further object of the invention is the novel way in which the fork is handled, so that the hay can be dumped in either a forward or a rearward direction.

The invention consists in the novel features and combination of parts, which will be more fully set forth hereinafter and recited in the appended claims.

In the drawings which form a part of this application, Figure 1 is a side elevation. Fig. 2 is a plan view. Fig. 3 is a detail of the locking-catch and the mode of attaching the derrick-arms to the mast, and Fig. 4 is an enlarged side view of the fork and the end plate.

Referring more specially to the drawings, 1 represents suitable runners of the usual drag-sled and which are provided with the transverse and diagonal braces 2 and 3, respectively. Pivotally secured to and rising from the central transverse brace 2 is a mast 4, which is braced in its upright position on the drag-sled by brace-rods 5, extending from the fore and rear transverse brace 2. These brace-rods 5 are all connected at a suitable point on the mast 4 by a band 6, which surrounds the mast and allows it to turn therein.

Rigidly secured to either side of the upper portion of the mast are two irons 7, which are adapted to straddle and pivotally support the walking-beam 8, which is braced in its length by a metallic rod 9 and upright 9'. At one end of the walking-beam 8 is secured an eye 10, which is adapted to support the ordinary block and tackle 11, said block and tackle being connected at its opposite end to a pull-brace 12, which extends from one of the runners to the central transverse brace 2. At the opposite end of the walking-beam 8 there is provided a hook 13, adapted to support, by means of flexible rods 14, the fork and derrick-arms, which will be hereinafter described. One end of the rope of the block and tackle 11 is carried around a pulley 15, secured to the pull-brace, and at its outer end is provided with a swingletree 16, to which a horse is hitched.

It will be evident from the foregoing description that upon driving the horse away from the stacker the end of the walking-beam upon which the eye 10 is secured will be drawn down and the opposite end raised, carrying with it the fork and derrick-arms. Pivoted for vertical oscillation to the mast, just below the irons 7, are two arms 17, which diverge from their pivotal point, and at their extremities are provided with brace-irons 18, between and to which is pivotally secured the fork 19. These arms, intermediate their length, are provided with suitable transverse and diagonal braces 20 and 21, respectively.

The fork 19 consists of a bar 22, to which is rigidly secured the plates 23 at each end thereof, which plates are provided with a circular series of holes, which lie in circles whose centers are the pivotal connections of plates 23 with brace-irons 18.

Extending out a short distance from each arm 17 parallel with the brace-irons 18 is a short stub-iron 24, in which and also in the iron 18 is reciprocally mounted pin-catches 25, which are normally forced inward by the spiral springs 26 to engage the holes in the plates 23. Extending out from the fork-beam 22 in either direction are the forked teeth 27, which are braced by wires 28.

Extending from one arm 17 on the derrick is what is termed a "bull-rope" 29 for moving the fork in its rotary direction, and extending from the outer end of latch 25 is a rope 30, by which the latch is withdrawn from its engagement with the holes in the plate 23. After the hay has been dumped the weight of the fork-beam 22 acts as a pendulum and returns the fork to normal position. The catch is then released to engage the holes in the plate 23, thus holding the fork in position for reloading.

The rear brace 5 and the pull-brace 12 may be changed to the opposite side from which they are now shown, if deemed necessary, without altering the scope of the invention.

Having thus described the structure of the device, I will now describe the operation thereof.

The fork is lowered to the ground, and when in this position the teeth which extend outwardly from the mast lie flat upon the ground, and the opposite teeth are in a perpendicular position. This allows the operator to push the hay upon the teeth, and as the fork rises the hay balances more toward the center and rests upon the braces 28 and the fork-beam 22. The bull-rope is used to guide the fork in its movement over the stack, and if it is desired to dump the hay away from the mast the heft thereof is allowed to rest upon the teeth opposite from the mast. The latch is then pulled a sharp quick jerk and then allowed to recede, so as to enter the next succeeding opening. This insures the weight of the hay falling upon the outer teeth. The latch is again pulled all the way, and the weight of the hay now being on the forward teeth the dumping of the hay away from the mast is assured, whereas if it is desired to dump the hay toward the mast the heft of the hay is allowed to rest upon the inner teeth of the fork and the latch completely withdrawn, allowing the hay to dump between the derrick-arms.

Having thus described my invention, what I claim as new, and desire to secure by Letters Patent, is—

1. In a stacker, the combination with a swinging arm, of a stacking-receptacle pivoted to said arm, and releasable means for latching or fastening said stacking-receptacle to said arm in different tilted positions.

2. In a stacker, the combination with a swinging arm, of a stacking-receptacle pivoted to said arm to tilt on a substantially horizontal axis, and releasable means for latching or fastening said stacking-receptacle to said arm in different tilted positions.

3. In a stacker, the combination with a swinging arm, of a stacking receptacle pivoted to said arm, and releasable means for latching or fastening said stacking-receptacle to said arm in different tilted positions comprising a releasable latch and a plate having a plurality of openings to engage the latch, said openings being disposed in succession at substantially equal distances from the pivotal point of the stacking-receptacle.

4. In a device of the class described, the combination with a suitable support, of a mast rotatably secured thereto, arms pivoted to said mast and extending outwardly therefrom, a walking-beam pivoted to said mast and connected at one end to said arms, power-operated means connected to said support and to the other end of said walking-beam, whereby the arms are raised or lowered, a fork pivotally secured between said arms, and a latch under the control of the operator for controlling the direction which the fork is to tilt and dump.

In testimony whereof I hereunto affix my signature in presence of two witnesses.

FRANK ALTON KIME.

Witnesses:
C. W. MADDEN,
LYTLE HOWARD.